Jan. 9, 1951     M. D. SCHLEGEL, SR     2,537,552

STABILIZING AND LUBRICATING PIVOT BOLT

Filed Sept. 17, 1946

Mark D. Schlegel, Sr.,
INVENTOR.

BY McMorrow, Berman
and Davidson
Attorneys

Patented Jan. 9, 1951

2,537,552

UNITED STATES PATENT OFFICE 2,537,552

STABILIZING AND LUBRICATING PIVOT BOLT

Mark D. Schlegel, Sr., Toledo, Ohio

Application September 17, 1946, Serial No. 697,505

1 Claim. (Cl. 308—2)

The present invention relates to self-lubricating and stabilizing devices and is more particularly concerned with novel means to oil and stabilize the joints of metallic elements in frictional contact.

The primary object of the invention is to provide means to automatically lubricate the joints of metallic elements in frictional contact and to stabilize the relative positions thereof.

Another object of the invention is to provide a device of the character referred to of simpler and more compact construction than prior devices.

A further object of the invention is to provide a simple and durable device of the character referred to which can be readily mounted on shears, especially those used on heavy work such as tree, hedge and shrubbery trimming.

With the foregoing and other objects and advantages in view the invention consists of the novel construction and arrangement of parts hereinafter described and claimed.

In the accompanying drawings illustrating the invention:

Like numerals, as used in the drawings and description to follow, designate the same parts of construction.

Figure 1:
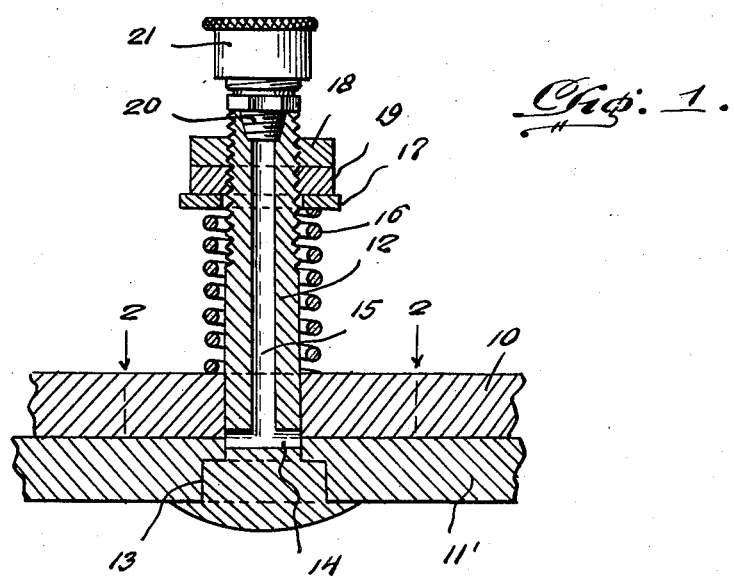
Figure 1 is a longitudinal section of the device.
Figure 2:
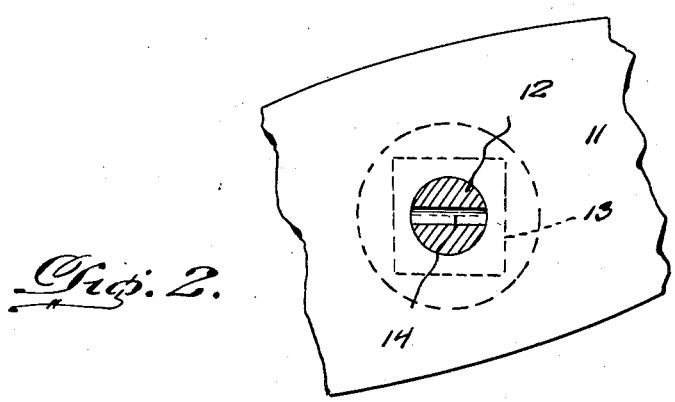
Figure 2 is an horizontal section on line 2—2 of Figure 1.

10 designates a fragment of one member of a pair of shears and 11 a fragment of the other member in the area of the joint. The two members are joined to pivot in frictional contact by means of a tubular bolt 12, the head of which is preferably formed with angular shoulders 13 which fit a recess in the underside of member 11 to prevent turning.

Positioned in bolt 12 to emit lubricant to the meeting surfaces of elements 10 and 11, is a transverse duct 14 which intersects the vertical duct or bore 15.

The bolt is threaded exteriorly, as at 15, from its top down to a suitable point for adjustment of a coiled spring 16 which is placed around the bolt. This helical spring is made of spring steel and is sufficiently heavy to maintain the members 10 and 11 in proper frictional engagement. A washer 17 is mounted on top of spring 16 and superimposed are two lock nuts 18 and 19. As will be obvious this spring will stabilize the working relation of members 10 and 11 regardless of wear due to the frictional engagement in the region of the pivotal joint.

The upper part of the bore 15 is threaded for reception of the threaded nipple 20 of a grease cup 21 of conventional type. The lubricant is fed thereby to bore or duct 15 and cross-duct 14, where it seeps out to the impinging surfaces of the members 10 and 11, thus keeping same well oiled and reducing wear at the joint.

As different embodiments may be made of this inventive concept and modications may be made in the embodiment hereinbefore shown and described, it will be understood that the matter herein is to be interpreted as illustrative merely and not in a limiting sense.

What I claim is:

A lubricating pivot device for a pair of opposed flat plates having inner flat faces arranged in sliding contacting relation, the plates having transverse openings arranged in registration, one plate being provided in its outer face and adjacent to the opening thereof with a polygonal recess, said device comprising an elongated unitary bolt mounted within the registering openings of the plates and serving to pivotally connect the plates for relative swinging movement, the bolt including a head at one end thereof engaging the outer face of the plate having the polygonal recess, the bolt having a short polygonal portion adjacent to and inwardly of the head and engaging within the polygonal recess for holding the bolt against rotation relative to the plate having the polygonal recess, the bolt extending transversely beyond the outer face of the opposite plate for a substantial distance, the bolt having a transverse lubricating port extending therethrough at a point adjacent to the contacting inner faces of the plates and a substantially central longitudinal port intersecting the transverse port and extending through the end of the bolt remote from the head, the bolt being externally screw threaded at its end remote from the head, a nut mounted upon the screw threaded end of the bolt, an expansible coil spring arranged between the plate remote from the head and nut and surrounding the bolt and serving to maintain the plate remote from the head in contact with the other plate, and a lubricating fitting secured to the end of the bolt remote from the head and arranged in communication with the longitudinal port for supplying lubricant to the inner contacting faces of the plates.

MARK D. SCHLEGEL, SR.

REFERENCES CITED

The following references are of record in the file of this patent:

UNITED STATES PATENTS

| Number | Name | Date |
|---|---|---|
| 619,999 | Sherman | Feb. 21, 1899 |
| 1,534,192 | Tryon | Apr. 21, 1925 |
| 1,538,648 | Noble | May 19, 1925 |
| 1,769,401 | Tancre | July 1, 1930 |

FOREIGN PATENTS

| Number | Country | Date |
|---|---|---|
| 165,396 | Germany | Nov. 16, 1905 |